(12) United States Patent
Gould et al.

(10) Patent No.: US 7,379,649 B2
(45) Date of Patent: *May 27, 2008

(54) FIBER OPTIC PATCH KIT AND METHOD FOR USING THE SAME

(75) Inventors: Glen Edward Gould, Peoria, IL (US); Andrew Matulica, St. Charles, IL (US); Dennis Joseph Byrne, New Baltimore, MI (US)

(73) Assignee: AT&T Knowledge Ventures, LP, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/636,890

(22) Filed: Dec. 11, 2006

(65) Prior Publication Data

US 2007/0086722 A1    Apr. 19, 2007

Related U.S. Application Data

(63) Continuation of application No. 11/122,320, filed on May 4, 2005, now Pat. No. 7,171,101, which is a continuation of application No. 10/085,430, filed on Feb. 28, 2002, now Pat. No. 6,905,263, which is a continuation of application No. 09/261,038, filed on Mar. 2, 1999, now Pat. No. 6,382,845.

(51) Int. Cl.
   *G02B 6/255*  (2006.01)
(52) U.S. Cl. .................. 385/135; 385/95; 385/134
(58) Field of Classification Search .............. None
   See application file for complete search history.

(56) References Cited

U.S. PATENT DOCUMENTS

| | | | |
|---|---|---|---|
| 4,359,262 A | 11/1982 | Dolan | |
| 4,615,581 A | 10/1986 | Morimoto | |
| 4,615,851 A * | 10/1986 | Theodore et al. | 264/634 |
| 4,666,240 A | 5/1987 | Caron et al. | |
| 4,673,246 A * | 6/1987 | Schembri | 385/134 |
| 4,699,460 A | 10/1987 | Szentesi | |
| 4,728,171 A | 3/1988 | Schofield et al. | |
| 4,805,979 A | 2/1989 | Bossard et al. | |
| 4,846,565 A * | 7/1989 | Swanson et al. | 385/135 |
| 4,913,512 A | 4/1990 | Anderton | |
| 5,016,952 A | 5/1991 | Arroyo et al. | |
| 5,185,843 A * | 2/1993 | Aberson et al. | 385/134 |
| 5,185,844 A | 2/1993 | Bensel, III et al. | |
| 5,278,933 A | 1/1994 | Hunsinger et al. | |
| 5,312,468 A * | 5/1994 | Yin et al. | 65/433 |
| 5,323,480 A | 6/1994 | Mullaney et al. | |
| 5,353,366 A | 10/1994 | Bossard | |
| 5,440,665 A | 8/1995 | Ray et al. | |
| 5,446,823 A | 8/1995 | Bingham et al. | |
| 5,479,553 A | 12/1995 | Daems et al. | |

(Continued)

*Primary Examiner*—Sung Pak
(74) *Attorney, Agent, or Firm*—Brinks Hofer Gilson & Lione

(57) ABSTRACT

The present method and kit provide for effective and efficient patching of fiber optic cables. The kit comprises mechanical fiber optic splicers, a fiber optic patch, a splice housing, and a protective housing. The mechanical fiber optic splicers can be used to splice the fiber optic cable and the fiber optic patch. The mechanical fiber optic splicers, the fiber optic patch, and a portion of the fiber optic cable can be enclosed within the splice housing. The splice housing can then be enclosed within a protective housing.

16 Claims, 8 Drawing Sheets

U.S. PATENT DOCUMENTS

| | | |
|---|---|---|
| 5,495,549 A | 2/1996 | Schneider et al. |
| 5,515,472 A | 5/1996 | Mullaney et al. |
| 5,528,718 A | 6/1996 | Ray et al. |
| 5,556,060 A | 9/1996 | Bingham et al. |
| 5,590,234 A | 12/1996 | Pulido |
| 5,617,501 A | 4/1997 | Miller et al. |
| 5,684,911 A | 11/1997 | Burgett |
| 5,793,921 A | 8/1998 | Wilkins et al. |
| 5,825,963 A | 10/1998 | Burgett |
| 6,064,791 A | 5/2000 | Crawford et al. |
| 6,363,200 B1 * | 3/2002 | Thompson et al. ......... 385/135 |
| 6,382,845 B1 | 5/2002 | Gould et al. |
| 6,905,263 B2 | 6/2005 | Gould et al. |
| 7,171,101 B2 * | 1/2007 | Gould et al. ................ 385/135 |
| 2005/0265680 A1 | 12/2005 | Gould et al. |

* cited by examiner

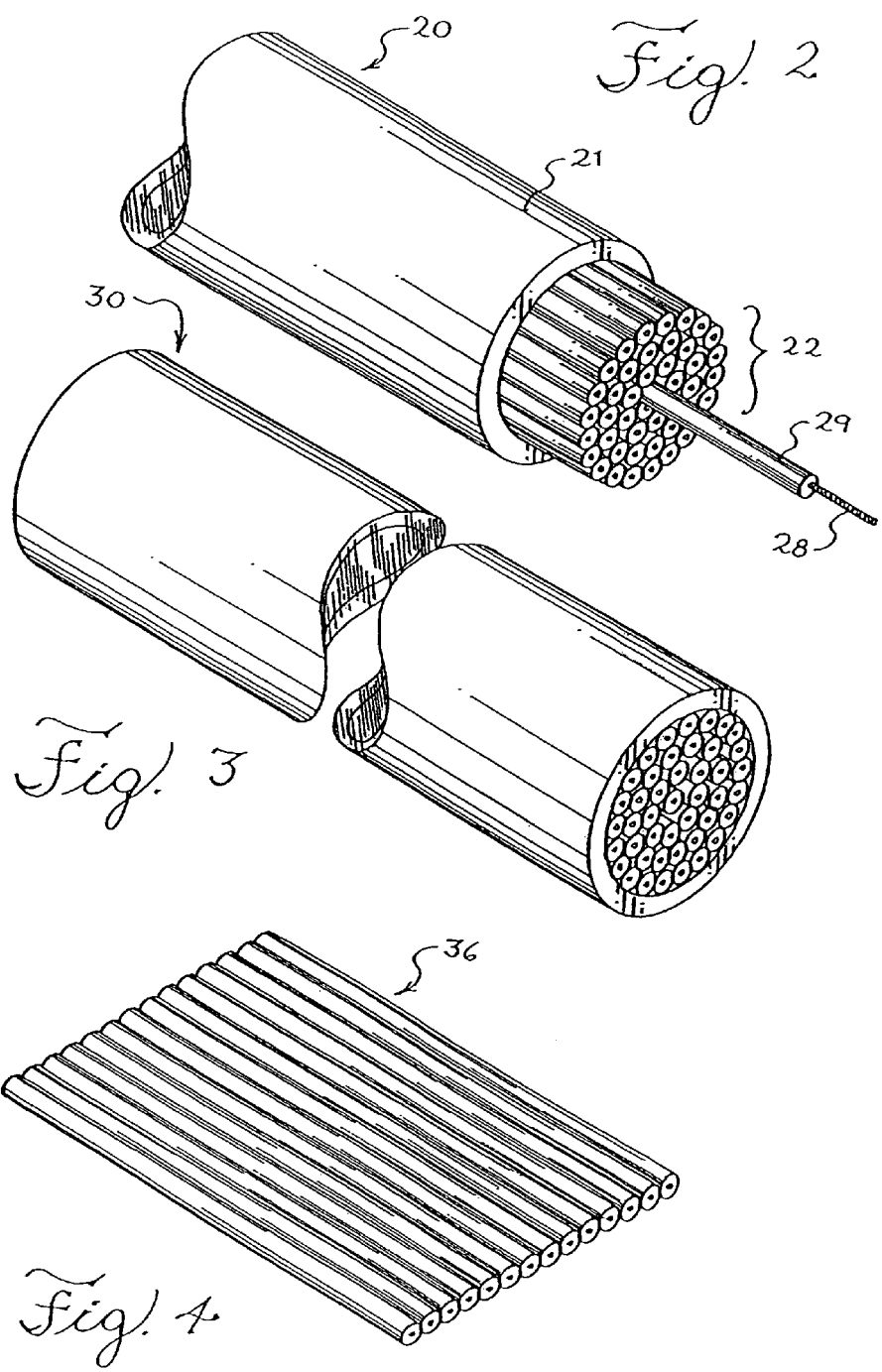

FIBER OPTIC PATCH KIT AND METHOD FOR USING THE SAME

RELATED APPLICATIONS

The present application is a continuation of U.S. patent application Ser. No. 11/122,320 (still pending), filed May 4, 2005, now U.S. Pat. No. 7,171,101 which is a continuation of U.S. patent application Ser. No. 10/085,430 (now U.S. Pat. No. 6,905,263, filed Feb. 28, 2002, which is a continuation of U.S. patent application Ser. No. 09/261,038 (now U.S. Pat. No. 6,382,845), filed Mar. 2, 1999, the entirety of each of which are hereby incorporated by reference.

BACKGROUND

The present invention relates generally to optical fibers and more specifically to patching fiber optic cables.

Fiber optic cables are utilized extensively in the telecommunications industry, as well as other industries, as a preferred transmission medium because of their ability to carry large amounts of data over long distances at high speeds. In order to carry the data, the fiber optic cables require an uninterrupted end-to-end link. Accordingly, any interruption in this end-to-end link may effect the performance of the fiber optic cable and can render the fiber optic cable inoperable.

One common cause of interruptions in a fiber optic cable's transmissions is damage to the cable. A cable is considered damaged when one or more of the individual optical fibers is cut or otherwise unable to effectively transmit data. One way in which fiber optic cables can be damaged is when they are unintentionally cut. When a fiber optic cable is cut data can no longer be transmitted by the cable. Accordingly, it is important for the user of the fiber optic cable to repair the damaged portion of the cable as quickly as possible.

To repair a damaged fiber optic cable, a patch length of fiber optic cable is typically inserted between the ends of the damaged cable. Traditionally, the process of joining the patch length to the ends of the fiber optic cable has required the fusing of the patch to the two ends of the cable. This process requires a large excavation and the use of a fusion machine and a clean room. The ends of the fiber optic cable and the ends of the patch that are to be spliced are brought together and then heated so as to fuse the ends together. This process of fusion splicing is typically done in a clean room environment. In such a splicing process, a patch of approximately 200 feet is commonly used. After completing the fusion splicing, the fused portions of the fiber optic cable and the patch are often encased in a housing to protect the splices.

This method necessarily requires a significant amount of time and money to complete the repair. A large number of people are needed to create the large excavation that is needed to effectuate the repair. Also, this method requires the use of two separate enclosures to protect the two fused portions of the fiber optic cable. Moreover, this process requires a large amount of time to complete. A system and method for splicing optical fibers that overcomes these deficiencies is needed.

BRIEF DESCRIPTION OF THE DRAWINGS

FIG. 2 is perspective view of a fiber optic cable of a first preferred embodiment.

FIG. 3 is a perspective view of a fiber optic patch of a first preferred embodiment.

FIG. 4 is a perspective view of a fiber optic patch of a second preferred embodiment.

DETAILED DESCRIPTION OF THE DRAWINGS

By way of introduction, the present embodiments provide a kit and method for efficiently and effectively patching a fiber optic cable that reduces the time and costs associated with effectuating such a patch. The kit comprises a plurality of mechanical fiber optic splicers, a fiber optic patch, a splice housing, and a protective housing. The fiber optic patch can be connected to the ends of the fiber optic cable though the use of the mechanical fiber optic splicers. The fiber optic cable, mechanical fiber optic splicers, and the fiber optic patch, can be placed within the splice housing to protect the fiber optic cable and the fiber optic patch. The splice housing can be placed within the protective housing to further protect the fiber optic cable and the fiber optic patch. An angle cleaver can be used in conjunction with this kit and method to create angle cleaves on the fiber optic cable and the fiber optic patch prior to splicing. Angle cleaving of the fibers reduces reflections in the fibers.

Figure 1:
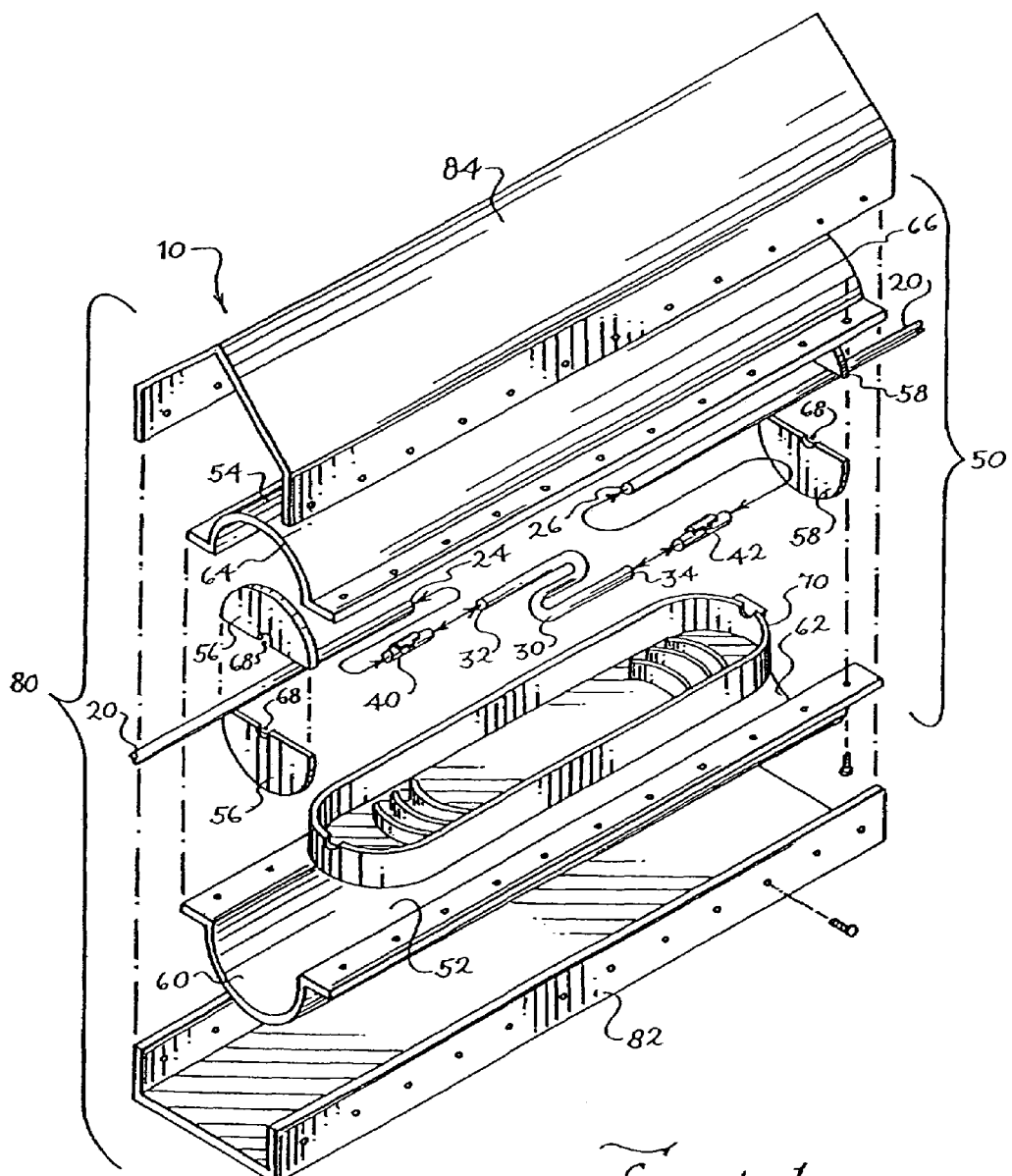
FIG. 1 is an exploded perspective view of first preferred embodiment of a fiber optic patch kit.

By way of example, a preferred embodiment of the fiber optic patch kit 10 is depicted in FIG. 1. The kit comprises a fiber optic patch 30, a plurality of mechanical splicers 40, 42, a splice housing 50, a splice tray 70, and a protective housing 80. The kit 10 can be used to patch the fiber optic cable 20 by connecting the first and second ends 24, 26 of the fiber optic cable. The fiber optic cable 20 can comprise any number of individual optical fibers 22 that are bundled within an outer sheath 21 as shown if FIG. 2. Fiber optic cables typically contain 6 to 432 fibers arranged individually or in groups of 12. Each of the individual fibers 22 comprises a glass fiber 28 surrounded by plastic cladding 29.

Referring again to FIG. 1, the fiber optic patch 30 comprises one or more optical fibers. The fiber optic patch 30 preferably comprises a group of individual optical fiber as shown in FIG. 3. One such fiber optic patch is a 24-fiber RHINO patch. Alternatively, the fiber optic patch 36 can compose a one or more fiber ribbons as shown in FIG. 4. One such fiber optic patch 36 is a 72 fiber ribbon RHINO patch. The fiber optic patch 30, 36 is preferably 72 inches long. Alternatively, the fiber optic patch 30, 36 can be of any length required to implement the present embodiments.

The fiber optic patch 30 comprises a first end 32 and a second end 34. The first and second ends 32, 34 are adapted to be coupled with the first and second ends of the fiber optic cable 24, 26 through the use of the mechanical fiber optic splicers 40, 42. The diameter of the fibers within the fiber optic patch 30 should be selected to match the diameter of the fibers within the fiber optic cable 20.

The mechanical fiber optic splicers 40, 42 can be used to mechanically join the fiber optical cable 20 and the fiber optic patch 30. The mechanical fiber optic splicers 40, 42 align the individual fibers within the fiber optic cable 20 and the individual fibers within the fiber optic patch 30 with one another. When the mechanical fiber optic splicers 40, 42 are actuated, they hold the individual fibers in place to form a permanent splice between the fibers. The specific mechanical fiber optic splicer required to splice each fiber optic cable 20 and fiber optic patch will vary depending upon the diameter of the fibers within the fiber optic cable 20.

The mechanical fiber optic splicers 40,42 preferably comprise the 3M Fibrlok™ II 2529 Universal Optical Fiber Splice. This mechanical fiber optic splicer is preferred when splicing single fibers within the fiber optic cable 20 and the fiber optic patch 30. Other suitable mechanical fiber optic splicers are well known to those skilled in the art. Alternatively, the mechanical fiber optic splicers 40, 42 can comprise the 3M 2500 Multi-Fibrlok. This mechanical fiber optic splicer is preferred when simultaneously splicing multiple fibers within the fiber optic cable 20 and the fiber optic patch 30.

The splice housing 50 defines an internal cavity 52 that receives and protects a portion of the fiber optic cable 20, the fiber optic patch 30, and the mechanical fiber optic splicers 40, 42. The splice housing 50 encloses these elements and prevents dirt and other debris from coming in contact with them. In a preferred embodiment, the splice housing 50 creates a water-tight seal around these elements to prevent liquids form coming in contact with them.

In one embodiment, the splice housing 50 comprises a splice housing base 52, a splice housing top 54, and end plates 56, 58. The splice housing base 52 preferably comprises first and second ends 60, 62. The splice housing top 54 preferably comprises first and second ends 64, 66 and is adapted to be removably coupled with the splice housing base 52. The end plates 56, 58 preferably comprise recessed portions 68 that are sized and shaped to receive the fiber optic cable 20 and are adapted to be removably coupled with the splice housing top and base 52, 54. The splice housing is preferably assembled by bolting the various components to one another.

One suitable splice housing is 2-Type Closure such as the LightLinker Closure Kits available from 3M. This Closure Kit is available in diameters of 7 to 9½ inches and in lengths of 18 to 84 inches. Other suitable splice housing are well known to those skilled in the art. The splice housing 50 is preferably between six and eight feet long and preferably has a round cross section with a diameter of eight inches.

The splice tray 70 receives and holds the mechanical fiber optic splicers 40, 42 in place after the fiber optic cable 20 and the fiber optic patch 30 have been spliced. The splice tray 70 secures the mechanical fiber optic splicers 40, 42 in place and prevents and damage that may be caused by movement of the mechanical fiber optic splicers 40, 42. The splice tray 70 also serves to organize any slack lengths of either the fiber optic cable 20 or the fiber optic patch 30 that may be located within the splice housing 50 after the splicing has been completed. The splice tray 70 is preferably adapted to be coupled with an internal surface of the splice housing 50. A plurality of splice trays can be used to hold multiple mechanical fiber optic splicers 40. One suitable splice tray is the Universal Splice Tray, model FST 2000HV, available from P.S.I.

The protective housing 80 comprises a protective housing base 82 and a protective housing top 84. The protective housing top 84 is adapted to be removably coupled with the protective housing base 82. The protective housing 80 defines an internal cavity 86 that is sized and shaped to receive the splice housing 50. The protective housing 80 is utilized when the splice housing 30 is buried in the ground. The protective housing 80 serves to deflect the strain associated with backfilling an excavation in which the fiber optic cable 20 is located. One such protective housing is available from U-Teck. The protective housing is preferably assembled by bolting the various components to one another.

Figure 5:
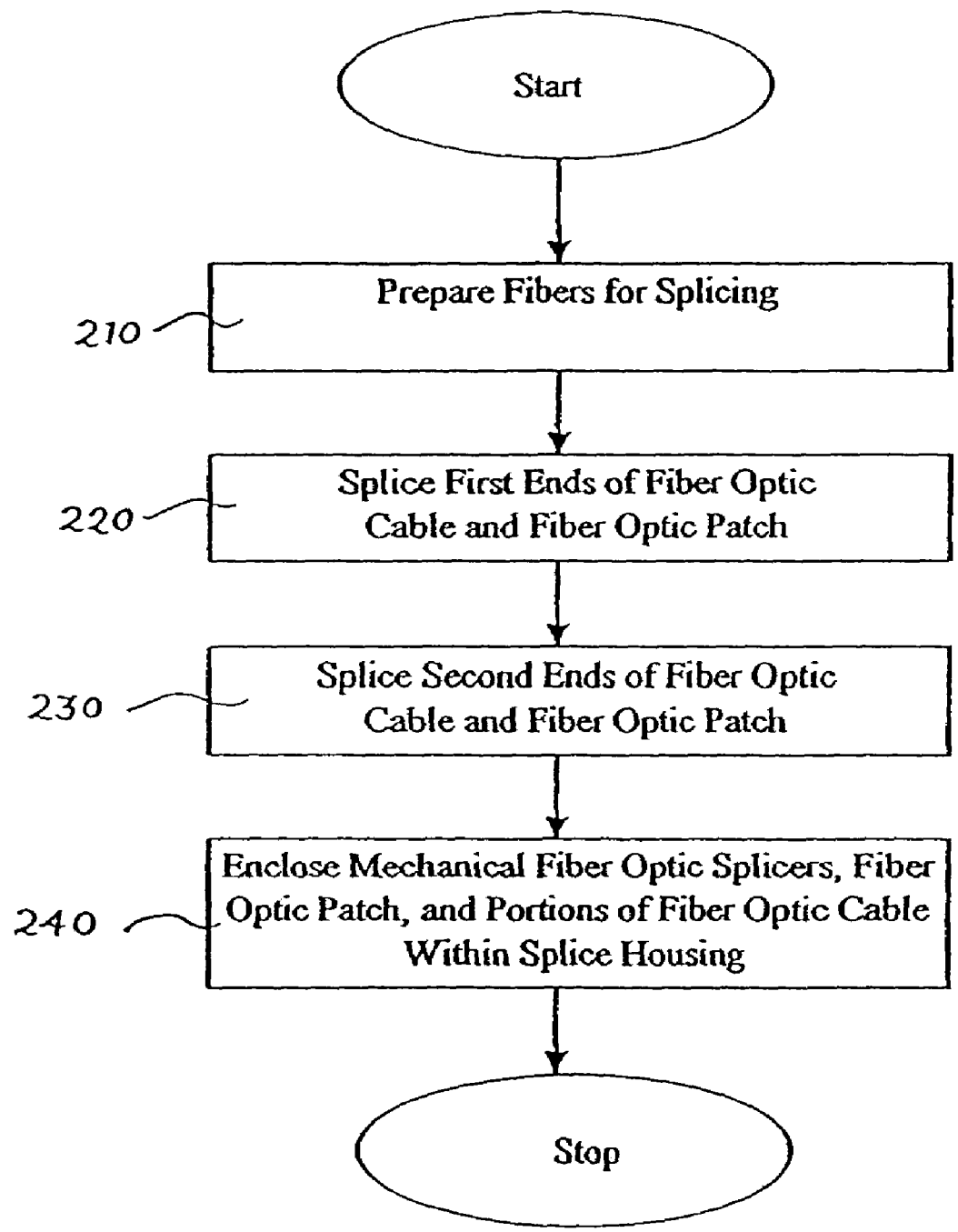
FIG. 5 is a flow chart of a method of a preferred embodiment for patching a fiber optic cable using the kit of FIG. 1.

The kit depicted in FIG. 1, can be used to perform the method 200 depicted in FIG. 5. Before the fiber optic cable 20 and the fiber optic patch can be spliced, each of the fibers within both the fiber optic cable 20 and the fiber optic patch must be prepared for splicing (step 210). After each of the fibers has been prepared, the first end of the fiber optic cable is spliced to the first end of the fiber optic patch 30 using one or more mechanical fiber optic splicers 40 (step 220). The second end of the fiber optic cable 20 is then spliced to the second end of the fiber optic patch 30 using one or more mechanical splicers 42 (step 230). The fiber optic patch 30, mechanical splicers 40, 42, and a portion of the fiber optic cable 20 are then enclosed within the splice housing 50 (step 240).

Figure 6:
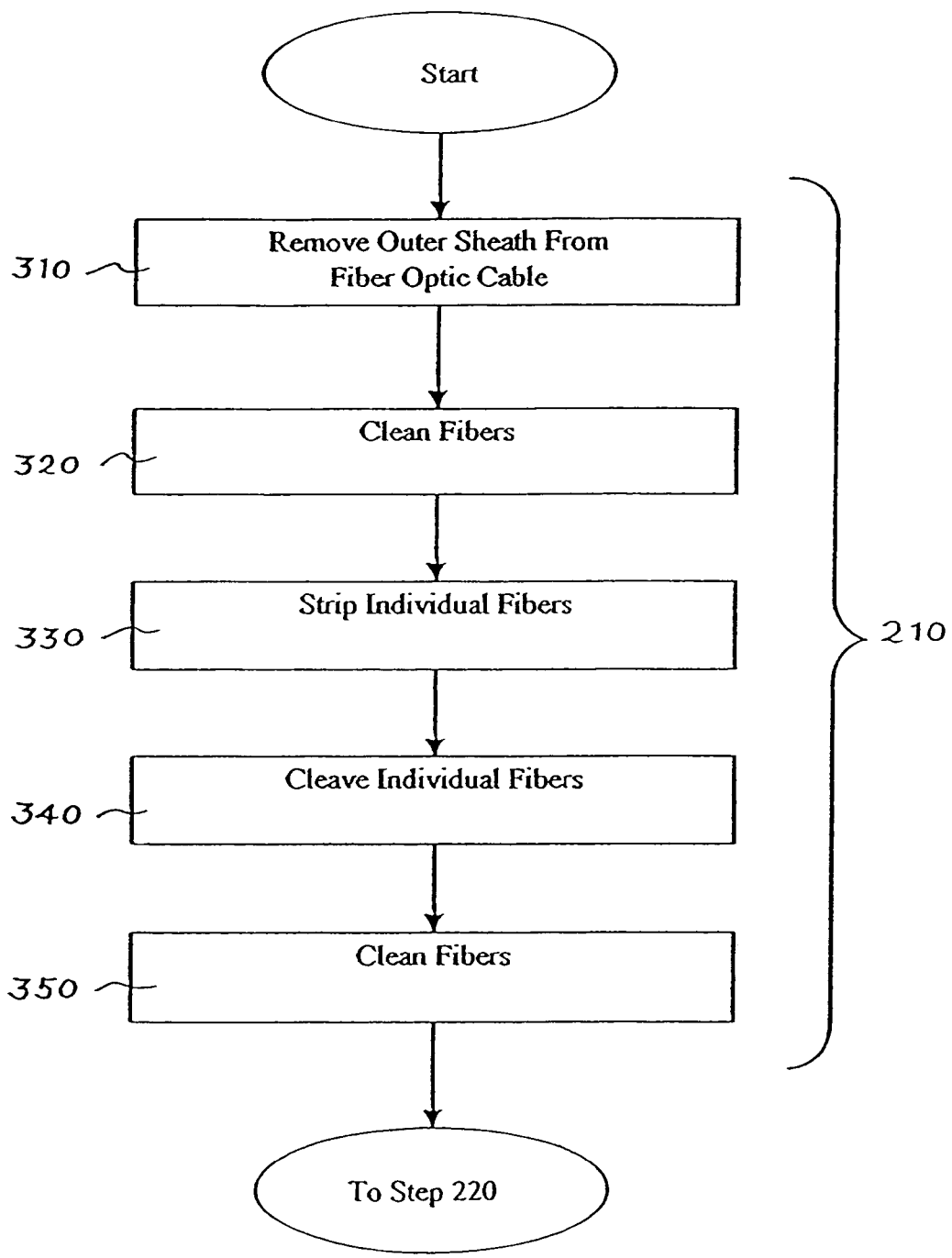
FIG. 6 is a more detailed flow chart of a portion the method of FIG. 5.

The step of preparing the fibers within the fiber optic cable 20 and the fiber optic patch 30 (step 210) can comprise the steps depicted in FIG. 6. The outer sheath that surrounds each the fiber optic cable 20 is removed (step 310) to expose the individual fibers. The outer surfaces of the exposed fibers are then cleaned (step 320). Each individual fiber within both the fiber optic cable 20 and the fiber optic patch 30 are stripped to remove the cladding (step 330). Each individual fiber is then cleaved (step 340). The fibers are preferably cleaved at approximately a 45 degree angle. Alternatively, the angle of the cleave can be between 30 and 90 degrees.

A standard cleaver, such as those available from Alcoa Fujikura Ltd. can be converted to produce angle cleaves. The modification primarily involves modifying the anvil in the cleaver. The standard anvil that is included in the cleaver can be replaced with a modified anvil. One modified anvil is provided in the Angle Cleaver Kit, model 2650ACK available from 3M. The modified anvil enables the cleaver to produce and angle cleave. In addition the upper and lower outside pads must be replaced so that the angle cleave can be created.

After being cleaved, each individual fiber must be cleaned (step 350). Each of the individual fibers within the fiber optic cable 20 and the fiber optic patch 30 are preferably prepared in this manner prior to splicing.

Figure 7:
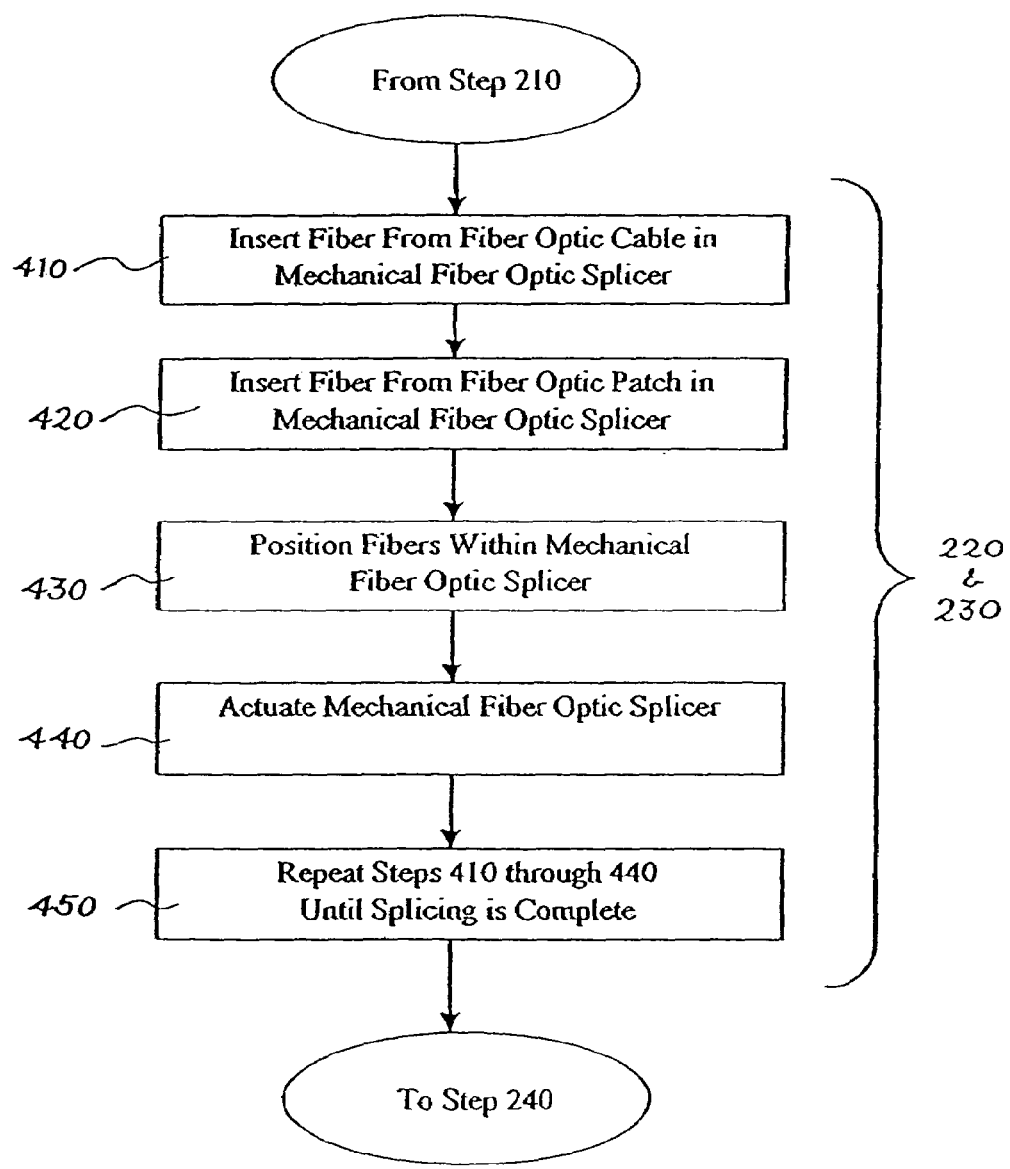
FIG. 7 is a more detailed flow chart of a portion the method of FIG. 5.

The steps of splicing the fiber optic cable 20 and the fiber optic patch 30 (steps 220, 230) preferably comprise the steps shown in FIG. 7. A first fiber optic splicer 40 is used to join at least one of the fibers at the first end of the fiber optic cable 24 and at least one of the fibers at the first end of the fiber optic patch 32. The first fiber from the first end of the fiber optic cable 24 is inserted into the first mechanical fiber optic splicer 40 (step 410). The first fiber from the first end fiber optic patch 32 is inserted into the opposite end of the mechanical fiber optic splicer 40 (step 420). The fibers are then positioned within the fiber optic splicer 40 (step 430). The mechanical fiber optic splicer 40 is then actuated (step 440), preferably through the use of a Fibrlok Assembly Tool.

Steps 410 through 440 are repeated (step 450) for all of the remaining fibers at the first end of the fiber optic cable 24 as well as for all of the fibers at the second end of the fiber optic cable 26. The splicing is complete when all the fibers at the first end of the fiber optic 24 cable have been spliced with the fibers at the first end of the fiber optic patch 32 and all the fibers at the second end of the fiber optic cable 26 have been spliced with the second end of the fiber optic patch 34.

Figure 8:
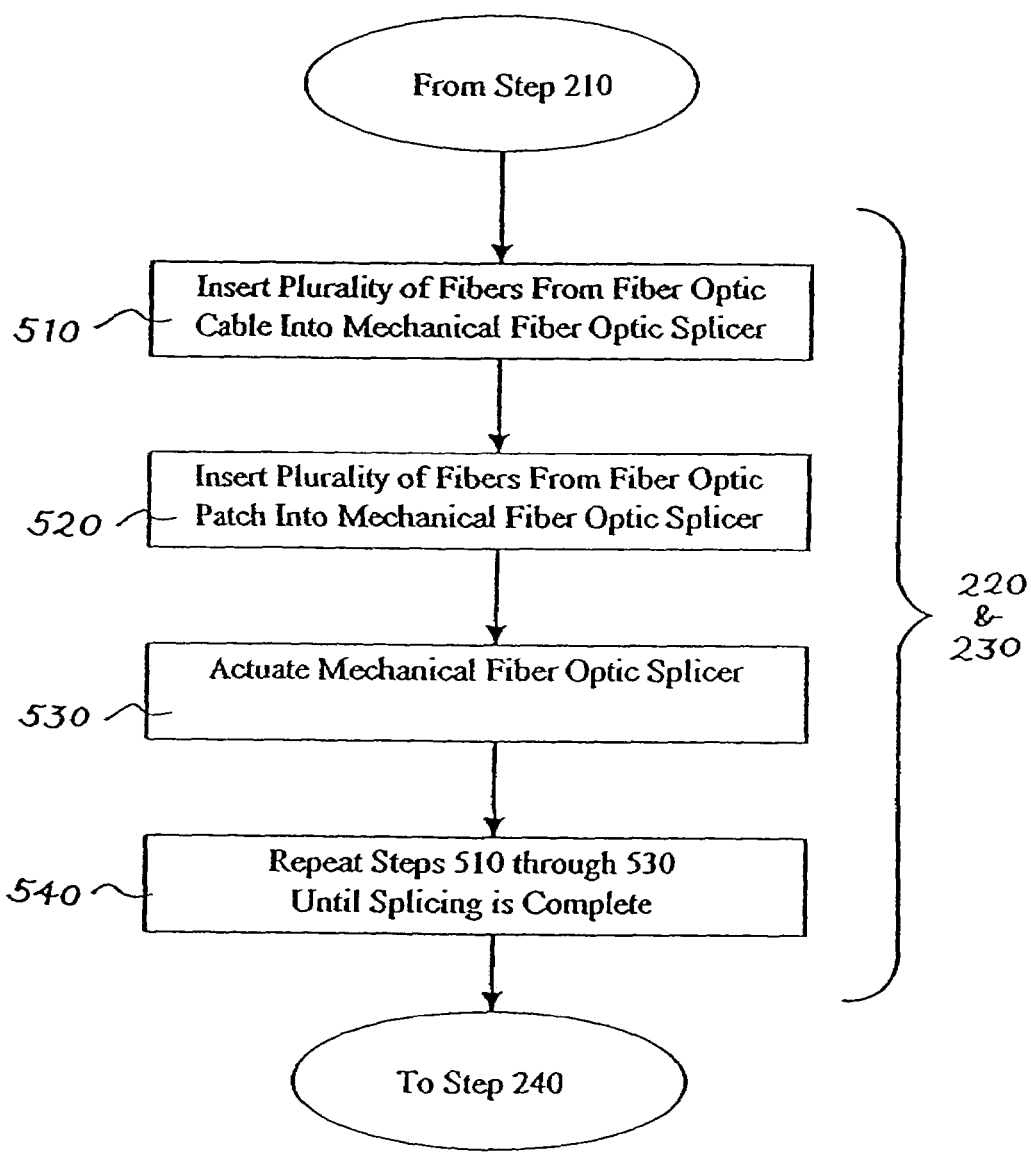
FIG. 8 is a more detailed flow chart of a portion the method of FIG. 5.

In an alternative embodiment, the steps of splicing the first and second ends of the fiber optic cable 24, 26 (steps 220, 230) can comprise the steps for simultaneously splicing multiple fibers as depicted in FIG. 8. After preparing and cleaving the fibers, as described above, a plurality of fibers from the fiber optic cable 20 and a plurality of fibers from the fiber optic patch 30 can be inserted into a mechanical fiber optic splicer (step 510). The mechanical fiber optic splicer can then be actuated (step 520). Steps 510 and 520 are then repeated (step 530) for all of the fibers at the first end of the fiber optic cable 20 as well as for all of the fibers at the second end of the fiber optic cable 20. The splicing is complete when all the fibers at the first end of the fiber optic cable have been spliced with the fibers at the first end of the fiber optic patch and all the fibers at the second end of the fiber optic cable have been spliced with the second end of the fiber optic patch.

Figure 9:
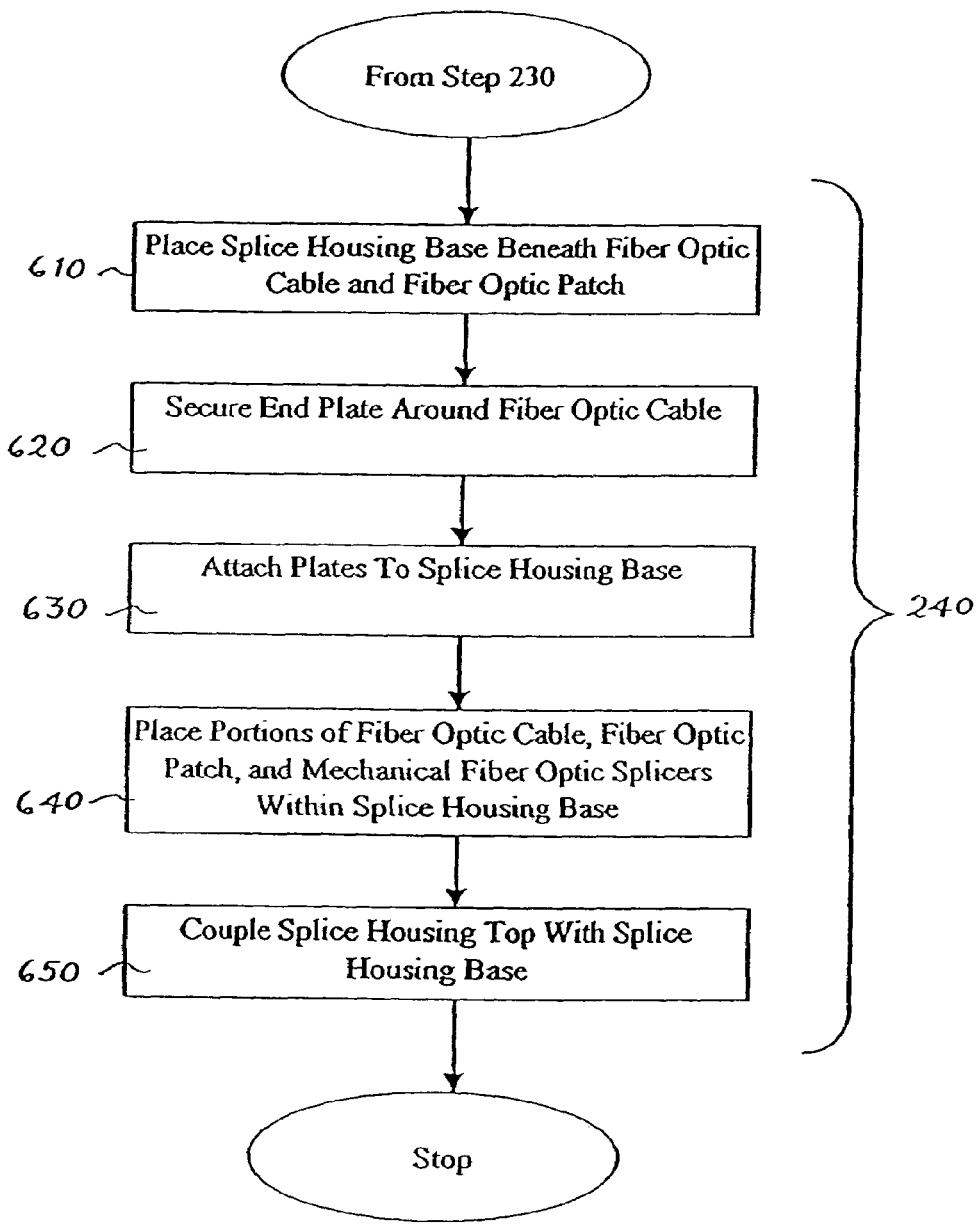
FIG. 9 is a more detailed flow chart of a portion the method of FIG. 5.

The step of enclosing the elements within the splice housing (step 240) can comprises the steps depicted in FIG. 9. The splice housing base 52 is placed beneath the fiber optic cable 20, the mechanical fiber optic splicers 40, 42, and the fiber optic patch 30 (step 610). The end plates 56, 58 are placed around the fiber optic cable 20 (step 620). The end plates 56, 58 are then attached to the first and second ends 60, 62 of the splice housing base 52 (step 630). The mechanical splicers 40, 42, the fiber optic patch 30, and portions of the fiber optic cable 20 are arranged within the splice housing base 52 (step 640). The splice housing top 54 is then coupled with the splice housing base 52 (step 650).

Sealing tape can be used in conjunction with steps 620, 630, and 650 to create a liquid-tight seal between the components of the splice housing 50. The sealing tape can be inserted between the components to create the liquid-tight seals. Any suitable sealing tape such as RTW 36 or RTE06 tape can be used.

In a preferred embodiment, after the fiber optic cable 20 and the fiber optic patch 30 have been spliced as described above, the splice tray 70 can be disposed within the splice housing 50. The mechanical fiber optic splicers 40, 42 can be placed within the splice tray 70 and any slack fiber optic cable and any slack fiber optic patch can be organized within the splice tray 70.

Figure 10:
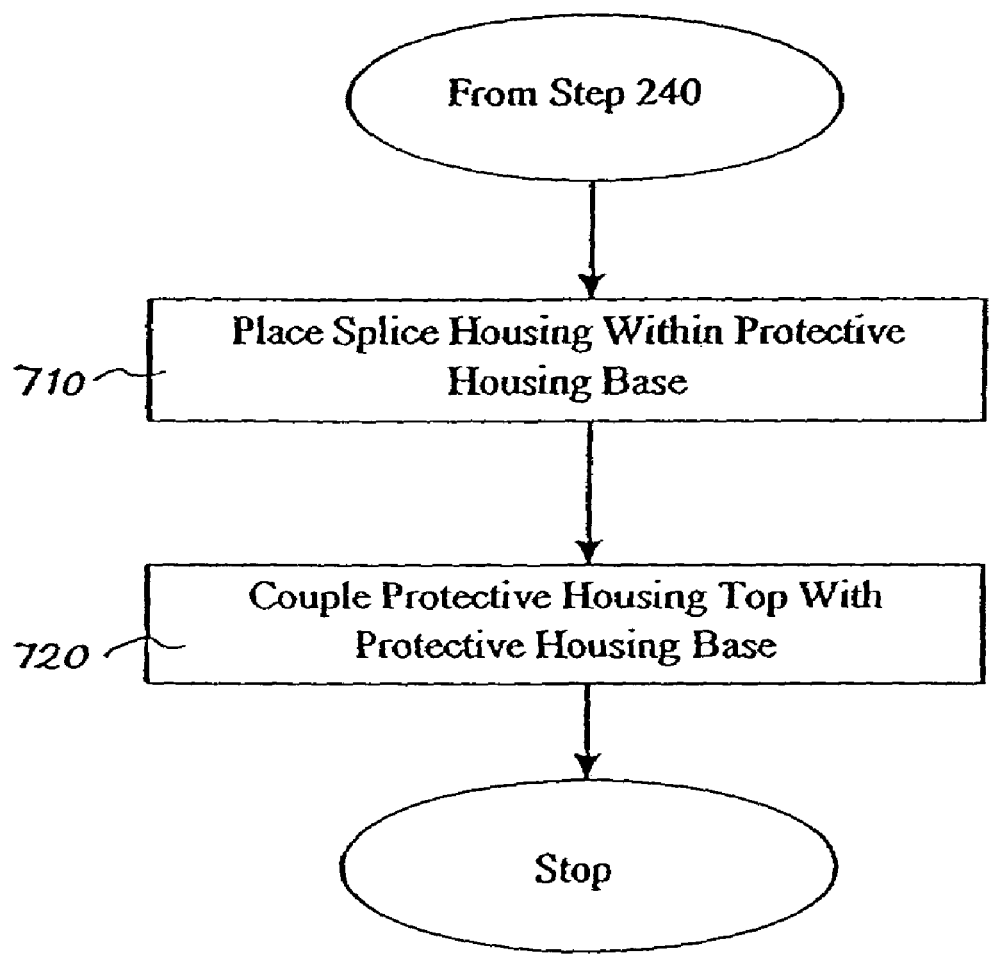
FIG. 10 is a more detailed flow chart of a portion the method of FIG. 5.

In a further preferred embodiment, the splice housing 50 can be enclosed within the protective housing 80 as depicted in FIG. 10. After the splice housing 50 has been assembled, as described above, the splice housing 50 can be placed within the base of the protective housing 82 (step 710). The top of the protective housing 84 can then be coupled with the base of the protective housing 84 (step 720).

Assume for purposes of this further alternative embodiment, that the fiber optic cable 20 is buried underground. After the portion of the fiber optic cable 20 that is to be patched has been located through procedures known to those skilled in the art, that portion of the fiber optic cable 20 is excavated prior to step 210, to expose the fiber optic cable 20. A preferred size of the excavation is 20 feet by 5 feet around the portion of the fiber optic cable 20. In addition, after the splice housing 50 has been placed within the protective housing 80, as described above in reference to FIG. 10, the protective housing can be placed within the excavation. The excavation can then be back-filled to rebury the fiber optic cable 20.

It is to be understood that a wide range of changes and modifications to the embodiments described above will be apparent to those skilled in the art and are contemplated. It is therefore intended that the foregoing detailed description be regarded as illustrative rather than limiting, and that it be understood that it is the following claims, including all equivalents, that are intended to define the spirit and scope of the invention.

The invention claimed is:

1. A fiber optic patch kit for patching a fiber optic cable, the fiber optic patch kit comprising:
   a fiber optic patch comprising a first end and a second end;
   a first mechanical fiber optic splicer operable to be coupled with at least a first portion of the fiber optic cable and the first end of the fiber optic patch;
   a second mechanical fiber optic splicer operable to be coupled with at least a second portion of the fiber optic cable and the second end of the fiber optic patch; and
   a single splice housing an internal water-tight cavity operable to receive the first and second mechanical fiber optic splicers, the fiber optic patch, and a part of both the first and second portions of the fiber optic cable;
   wherein the fiber optic patch and the first and second mechanical fiber ootic splicers are operative to exclusively patch the first portion of the fiber optic cable to the second portion of the fiber optic cable.

2. The fiber optic patch kit of claim 1, further comprising:
   a protective housing defining an internal cavity, the internal cavity being adapted to receive the single splice housing.

3. The fiber optic patch kit of claim 1, further comprising:
   a splice tray adapted to be removably disposed within the internal cavity of the single splice housing.

4. The fiber optic patch kit of claim 1, wherein the single splice housing comprises:
   a base comprising a first end and a second end;
   a top adapted to be coupled with the base, the top comprising a first end and a second end;
   a first end plate adapted to be coupled with the first ends of the top and the base; and
   a second end plate adapted to be coupled with the second ends of the top and the base.

5. The fiber optic patch kit of claim 1, wherein each optical fiber of the fiber optic cable is aligned with an optical fiber of the fiber optic patch.

6. The fiber optic patch kit of claim 1, wherein the fiber optic patch comprises an individual optical fiber.

7. The fiber optic patch kit of claim 1, wherein the fiber optic patch comprises a plurality of optical fibers.

8. The fiber optic patch kit of claim 1, wherein the fiber optic patch comprises a fiber optic ribbon.

9. A method for patching a fiber optic cable, the method comprising:
   mechanically splicing a first portion of the fiber optic cable to a first end of a fiber optic patch;
   mechanically splicing a second portion of the fiber optic cable to a second end of the fiber optic patch; and
   enclosing the fiber optic patch and a part of both the first and second portions of the fiber optic cable within an internal cavity of a single splice housing;
   wherein the fiber optic patch exclusively patches the first portion of the fiber optic cable to the second nortion of the fiber optic cable.

10. The method of claim 9, further comprising:
creating an angle cleave on the first portion of the fiber optic cable prior to mechanically splicing the first portion of the fiber optic cable to the first end of the fiber optic patch; and
creating an angle cleave on the second portion of the fiber optic cable prior to mechanically splicing the second portion of the fiber optic cable to a second end of the fiber optic patch.

11. The method of claim 9 wherein mechanically splicing the first portion of the fiber optic cable to the first end of the fiber optic patch and mechanically splicing the second portion of the fiber optic cable to the second end of the fiber optic patch comprises:
splicing the fiber optic cable and the fiber optic patch using mechanical fiber optic splicers.

12. The method of claim 11, further comprising:
disposing the mechanical splicers in a splice tray.

13. The method of claim 9, further comprising:
preparing the fiber optic cable prior to mechanically splicing the first portion of the fiber optic cable to the first end of the fiber optic patch.

14. The method of claim 9, further comprising:
enclosing the single splice housing within an internal cavity of a protective housing.

15. The method of claim 9, wherein enclosing the fiber optic patch and a part of both the first and second portions of the fiber optic cable within an internal cavity of a single splice housing comprises:
creating an air-tight seal within the internal cavity of the single splice housing.

16. The method of claim 9, further comprising:
disposing at least a portion of the fiber optic patch in a splice tray.

* * * * *

UNITED STATES PATENT AND TRADEMARK OFFICE
CERTIFICATE OF CORRECTION

PATENT NO.        : 7,379,649 B2
APPLICATION NO.   : 11/636890
DATED             : May 27, 2008
INVENTOR(S)       : Glen Edward Gould et al.

Page 1 of 1

It is certified that error appears in the above-identified patent and that said Letters Patent is hereby corrected as shown below:

On the Title Page

Item (56), line 1, delete "4,615,851 A * 10/1986 Theodore et al. ....264/634".

In column 6, in claim 1, line 16, after "mechanical fiber" delete "ootic" and substitute --optic-- in its place.

Signed and Sealed this

First Day of September, 2009

David J. Kappos
*Director of the United States Patent and Trademark Office*